United States Patent [19]
Marozsan et al.

[11] Patent Number: 5,180,248
[45] Date of Patent: Jan. 19, 1993

[54] METHOD AND APPARATUS FOR CORRECTING MISALIGNMENTS IN COUPLINGS

[75] Inventors: Andrew Marozsan; Daniel Peana, both of Boca Raton, Fla.

[73] Assignee: Motorola, Inc., Schaumburg, Ill.

[21] Appl. No.: 740,162

[22] Filed: Aug. 5, 1991

[51] Int. Cl.$^5$ ............................................. B25G 3/00
[52] U.S. Cl. .............................. 403/13; 403/DIG. 1; 464/29
[58] Field of Search .............. 403/13, DIG. 1; 464/29

[56] References Cited

U.S. PATENT DOCUMENTS

| | | | |
|---|---|---|---|
| 2,929,477 | 3/1960 | Rodriguez et al. | 464/29 X |
| 4,568,310 | 2/1986 | de Mey | 464/29 |
| 4,609,325 | 9/1986 | Gabrielli | 403/DIG. 1 X |
| 4,995,493 | 2/1991 | Cotsman et al. | 403/DIG. 1 X |

Primary Examiner—Andrew V. Kundrat

[57] ABSTRACT

An apparatus (100) for correcting misalignments in a robotic assembling devices has a first shaft (102) having a ferrous material (120) and a second shaft (104) having a magnetic material (122). The first and second shafts (102, 104) are magnetically coupled, and a motion on the first shaft (102) is provided to the second shaft (104) which corrects misalignments between the magnetic coupling (112) of the first and second shafts (102, 104).

5 Claims, 1 Drawing Sheet

METHOD AND APPARATUS FOR CORRECTING MISALIGNMENTS IN COUPLINGS

FIELD OF THE INVENTION

This invention relates in general to robotic assembling devices, and more specifically to an apparatus for correcting misalignments in a robotic assembling device.

BACKGROUND OF THE INVENTION

Ideally, devices used for holding or transferring parts in a robotic operated factory need to be automatically operated to facilitate hands-free operations or eliminate human interventions. This improves the speed of manufacturing and reduces injuries to or mistakes by human operators. In this way, automated factories will ultimately produce higher quality products at lower operational cost, which may increase profits to manufacturing companies or reduce cost to consumers, thereby allowing domestic companies to be more competitive in the world markets.

Currently, the available devices for holding or transferring parts to be processed on an automated factory line require some human operations, for example, they must be manually enabled and disabled (coupled and uncoupled) at a plurality stations. These human operated devices increase product cycle time, and may inadvertently result in injuries to the human operators thereby increasing the cost of production and manufacturing. Moreover, the laborious and repetitive nature of this coupling and uncoupling operations make it ideal for automation.

With multi-function end effector, operators currently use special tools to couple and to uncouple the end effector, this repetitive function only increases the processing time and the opportunity for accidents. Additional delays are incurred on some multi-function end effector, because high degrees of precision (accuracy) are required. As a result, operators have to frequently re adjust the couplings to maintain the desired precision.

Thus, what is needed is a robotic assembling device that automatically couples and uncouples, while maintaining a high degree of accuracy at the coupling joints to facilitate hands free operation.

SUMMARY OF THE INVENTION

An apparatus for correcting misalignments in a robotic assembling device has a first shaft having a ferrous material and a second shaft having a magnetic material. The first and second shafts are magnetically coupled, and a motion on the first shaft is provided to the second shaft which corrects misalignments of the magnetic coupling of the first and second shafts.

BRIEF DESCRIPTION OF THE DRAWINGS

The FIGURE is a side view of a multi-function end effector in accordance with the preferred embodiment of the present invention.

DESCRIPTION OF A PREFERRED EMBODIMENT

Figure 1:
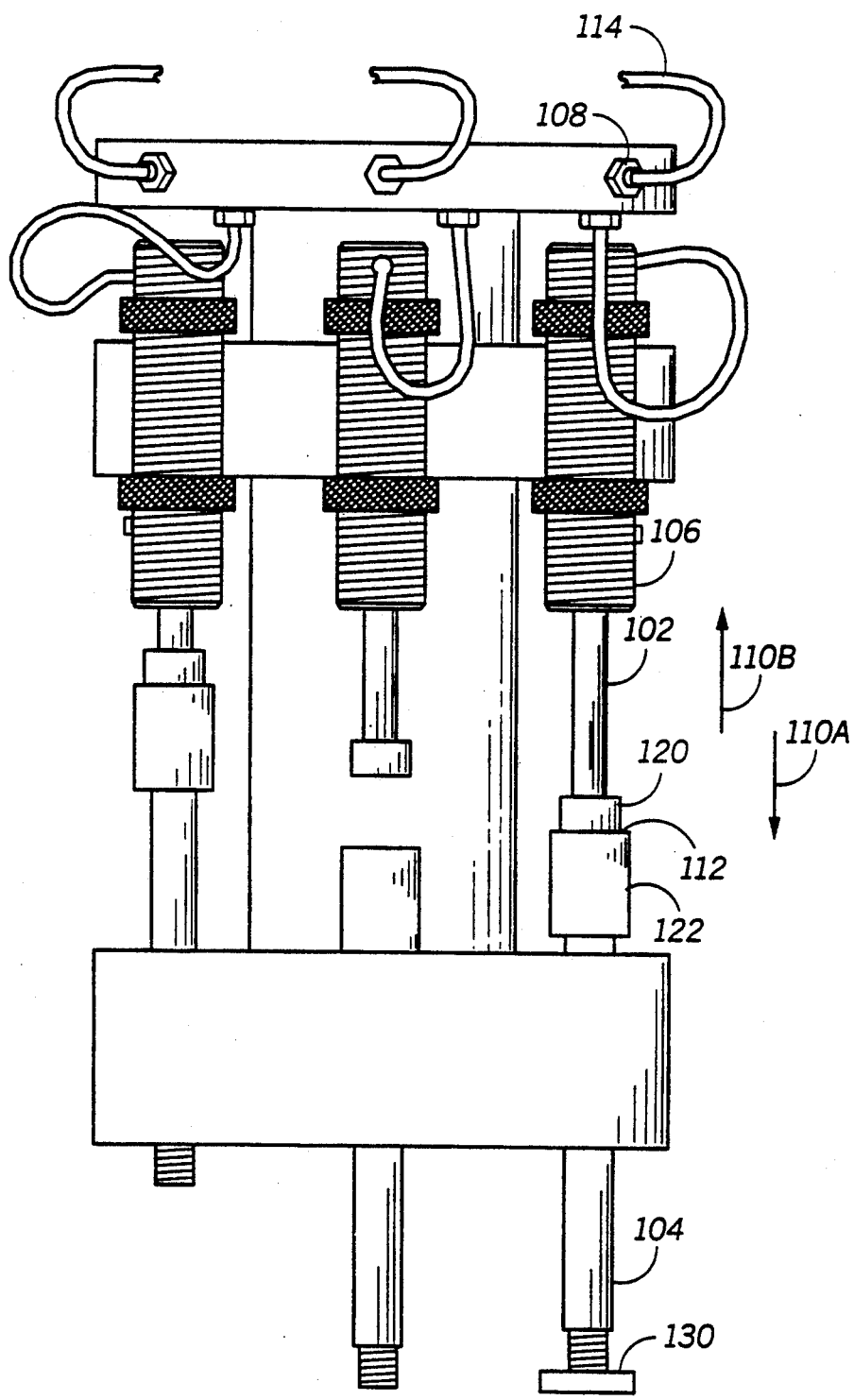

Referring to the FIGURE, a multi-function end effector 100 comprising a plurality of end effectors is shown. Each of the plurality of end effectors comprises a first shaft 102 and a second shaft 104. The first shaft 102 is conventionally coupled to an outer housing 106 that preferably includes a nozzle 108. The nozzle 108 is preferably coupled to a tube 114 which alternatively provides a pressure or a vacuum for moving the first shaft 102, preferably in directions 110A and 110B, respectively. Those skilled in the art will appreciate that different designs in the outer housing 106 (e.g., to include a motor) may cause the first shaft 102 to move in other directions, for example, vertical or rotational. The opposite end of the first shaft 102 is preferably coupled by conventional techniques to a ferrous material 120. To induce a magnetic coupling, the second shaft 104 is preferably coupled by conventional techniques to a magnetic material 122 diametrically positioned to the ferrous material 120 of the first shaft 102. In this way, the ferrous material 120 and the magnetic material 122 produces a magnetic attraction therebetween. Those skilled in the art will appreciate that the strength of the magnetic coupling 112 depends on the strength of the magnetic material 122. Thus, the proximity between or contact of the ferrous material 120 and the magnetic material 122 will cause sufficient attraction to effectuate the magnetic coupling 112 between the first and second shafts 102 and 104.

Operationally, when the first shaft 102 is positioned, for example, in an up position (closer to the outer housing 106), a pressure supplied to the nozzle 108, preferably an air pressure, forces the first shaft 102 toward the second shaft 104. When the first shaft 102 comes sufficiently close to or in contact with the second shaft 104, the magnetic material 122 attracts the ferrous material 120 (or vice versa) to produce the magnetic coupling 112 between the first and second shafts 102 and 104. Those skilled in the art will appreciate that the strength of the magnetic coupling 112 is determined by the attraction between the ferrous material 120 and the magnetic material 122. Thus, the strength of the magnetic coupling 112 may be increased or decreased by changing magnetic material 122 to another material of greater or lesser magnetic property, respectively.

Maintaining the air pressure on the first shaft 102 causes the first and second shafts 102 and 104 to move together in the direction 110A. The first shaft 102 is preferably manufactured with a lesser precision than the second shaft 104 as a cost saving feature. This difference in manufactured precision and other factors may cause misalignments between the magnetic coupling 112 of the first and second shafts 102 and 104 as they are moved together. The resulting misalignments are corrected by allowing the first and second shafts 102 and 104 to readjust itself at the magnetic coupling 112.

Thus, by maintaining a predetermined air pressure, the magnetic coupled first and second shafts 102 and 104 move at a speed insufficient to break the magnetic coupling 112 therebetween. This speed, however, is sufficient to produce enough force to cause the first and second shafts 102 and 104 to re adjust. This re adjustment aligns the magnetic coupling 112. That is, the movement causes the the first and second shafts 102 and 104 to shift at the magnetic coupling 112. This shifting continuously re aligns any misalignments in the magnetic coupling 112 which may be caused by the repositioning of the magnetic coupling 112 as the first and second shafts 102 and 104 move. In this way, the motion of the magnetic coupling 112 produces sufficient force to maintain the coupling between the first and second shafts 102 and 104, while permitting adjustments therebetween which realigns any contemporaneous misalignments produced in the magnetic coupling 112 as it moves.

Alternatively, by applying, preferably, a vacuum at the nozzle 108, the first and second shaft 102 and 104 are moved in the opposite direction 110. In this way, the second shaft 104 may be used, for example, to pick or to assemble parts 130 automatically. Those skilled in the art will appreciate that by applying the vacuum in a controlled manner, the change in force necessary to produce a motion in the opposite direction 110B may be controlled to a level insufficient to decouple the magnetic coupling 112. Similarly, by maintaining the vacuum, the first and second shafts 102 and 104 are moved in the opposite direction 110B. In this way, automatic assembling is facilitated.

Those skilled in the art will appreciate that the vacuum may be applied at a higher rate to cause an impulse force sufficient to break the magnetic coupling 112 therebetween. In this way, the magnetic coupling 112 between the first and second shafts 102 and 104 is uncoupled automatically by applying the vacuum at a force sufficient to break the magnetic force of attraction. Thus, the magnetic coupling 112 is automatically coupled and uncoupled by the application of the air pressure and the vacuum to the first and second shafts 102 and 104. Furthermore, by controlling the force applied to the first and second shafts 102 and 104, a resulting motion may be produced insufficient to break the magnetic coupling 112 therebetween, but sufficient to correct misalignments at the magnetic coupling 112.

In a second embodiment, the magnetic material 122 comprises an electro-magnet having an electrical coupling (not shown) to alternatively couple and uncouple the first and second shafts 102 and 104. Those skilled in the art will appreciate that instead of varying (e.g., increasing) the force to uncouple the magnetic coupling 112, the first and second shafts 102 and 104 may be coupled and uncoupled by electrically magnetizing and demagnetizing the electro-magnet.

We claim:

1. An apparatus in a robotic assembling device, comprising:

a first shaft having a ferrous material affixed thereto; and a second shaft having a magnetic material affixed thereto, the magnetic material providing an alignable magnetic coupling with the ferrous material of the first shaft for correcting misalignment therebetween when a rotational motion is provided along the vertical axis of the first and second shafts for rotating the first and second shafts, a force being exerted by the rotational motion moves the second shaft with respect to the first shaft which corrects misalignment in the alignable magnetic coupling.

2. The apparatus according to claim 1 wherein the magnetic material comprises an electromagnet for selectively coupling and uncoupling the first and second shafts.

3. The apparatus according to claim 1 wherein the speed of the rotational motion of the first and second shafts determines the amount of lateral force being exerted at the magnetic coupling.

4. A method for correcting misalignments in a robotic assembling device, comprising:

(a) magnetically coupling a first and second shafts;

(b) providing a rotational motion for rotating the first and second shafts wherein said rotational motion is controlled to exert a force on from the first shaft to the magnetically coupled second shaft for correcting misalignments therebetween without breaking the magnetically coupled first and second shafts.

5. An apparatus for correcting misalignments in a multi-function end effector, comprising:

a first shaft coupled to a ferrous material; and a second shaft coupled to a magnetic material for providing an alignable magnetic coupling between the ferrous material of the first shaft and the magnetic material of the second shaft wherein the first and second shafts are rotated along the vertical axis and the speed of rotation is controlled to exert a force on the alignable magnetic coupling for correcting misalignments therebetween without breaking the alignable magnetic coupling.

* * * * *